Figure 1:
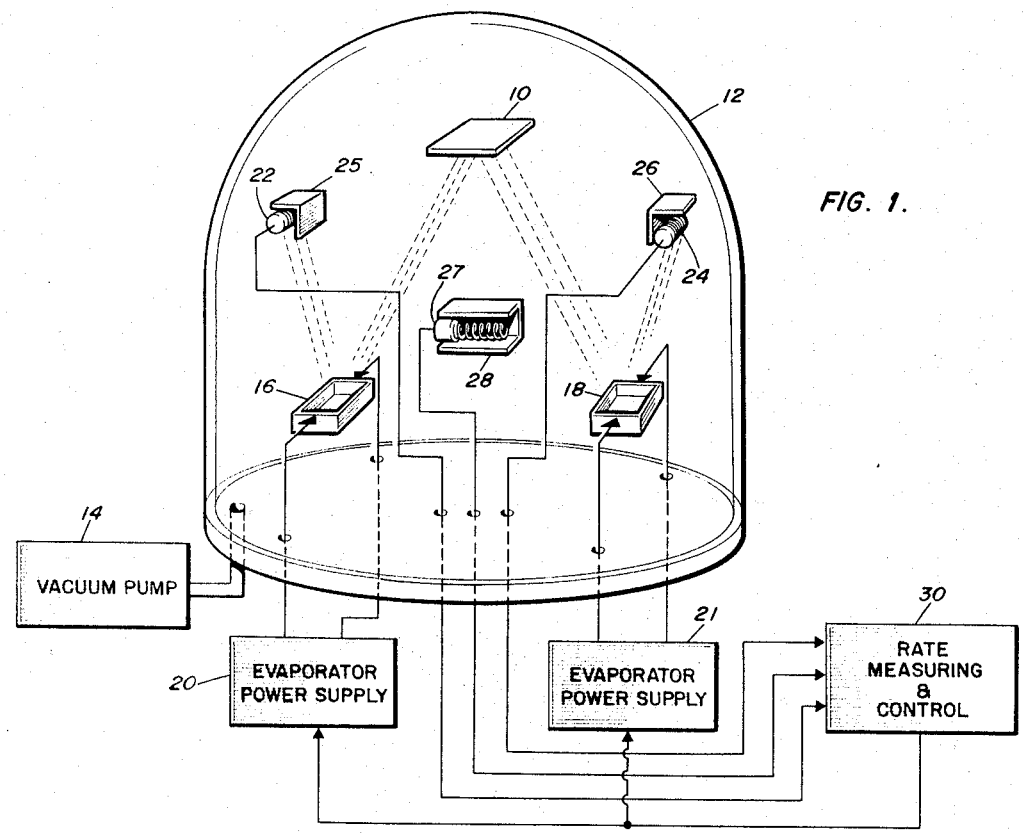

INVENTORS
THEODORE H. YAFFE
WILLIAM C. VERGARA
HAROLD M. GREENHOUSE

BY *Killman and Lamb*
ATTORNEYS

THEODORE H. YAFFE
WILLIAM C. VERGARA
HAROLD M. GREENHOUSE
INVENTORS

BY *Killman and Lamb*
ATTORNEYS

United States Patent Office 3,316,386
Patented Apr. 25, 1967

3,316,386
MULTIPLE EVAPORATION RATE MONITOR
AND CONTROL
Theodore H. Yaffe, Baltimore, William C. Vergara, Towson, and Harold M. Greenhouse, Timonium, Md., assignors to The Bendix Corporation, a corporation of Delaware
Filed May 20, 1964, Ser. No. 368,975
4 Claims. (Cl. 219—272)

The present invention relates to evaporation rate monitors and controls. More particularly, it relates to devices for determining the rate of molecular flow by measuring the vapor pressure in a stream of evaporated material.

In the manufacture of thin film microcircuitry, normally solid materials of various electrical properties are evaporated and condensed in controlled patterns of various thicknesses upon a substrate. The evaporation is conducted in a chamber in which the pressure is reduced to a near vacuum. The evaporation rate is measured by an ion gauge placed in the vapor stream of the evaporant. One form of gauge resembles a triode type electron tube with a positive bias placed on the grid and a negative voltage applied to the plate. The positive grid attracts electrons from the filament, while the negative plate attracts positive ions created by the collision of electrons with the vapor molecules traversing the electron stream. When the gauge is adjusted for constant electron emission, the plate current is proportional to the rate of vapor flow. A single gauge, however, cannot reliably measure vapor rate because of the presence of residual gases in the system. The residual or background gases may contribute significantly to the total pressure of the system. In order to separate the ion current due to background gases from the total ion current measured in a vapor stream, a second ion gauge may be installed in the system. The latter gauge is shielded from the vapor stream. Assuming the characteristics of both gauges to be identical, the difference between the ion currents is then a measure of the rate of evaporation of material in the vapor stream.

In the formation of certain components, resistors, for example, it is often desired to mix streams of vapor of different materials for simultaneous deposition. Thus, it is possible to mix a conducting material with an insulating material in various proportions and thereby produce films of various resistivities. Since the resistivity can be selected, resistors of a large range of values can be formed without resorting to impractical configurations nor requiring excessively tight tolerances on dimensions.

An object of the invention is to provide means for simultaneously measuring the evaporation rates of different materials in a common vacuum system.

Another object is to provide means for controlling the proportions of different materials in a vapor stream.

A further object is to control evaporation rates and hence, film thicknesses in a system for manufacturing thin film devices.

Other objects and advantages of the invention will become apparent as a more complete understanding of the invention is gained through the following detailed description and the accompanying drawings.

Briefly, the simplest embodiment of the invention comprises a pair of ion gauges, each exposed to the vapor stream from one of a pair of vapor sources, while shielded from the other and a third ion gauge shielded from both vapor sources but exposed to the background pressure. The ion current outputs are combined in a circuit which provides a differential output signal for controlling the temperature of one of the furnaces serving as a vapor source. The proportion of materials in the vapor stream is thereby maintained. Another differential output signal is provided for controlling the temperature of the furnace serving as the second vapor source, thus providing control of the evaporation rate for the composite vapor stream.

Figure 3:
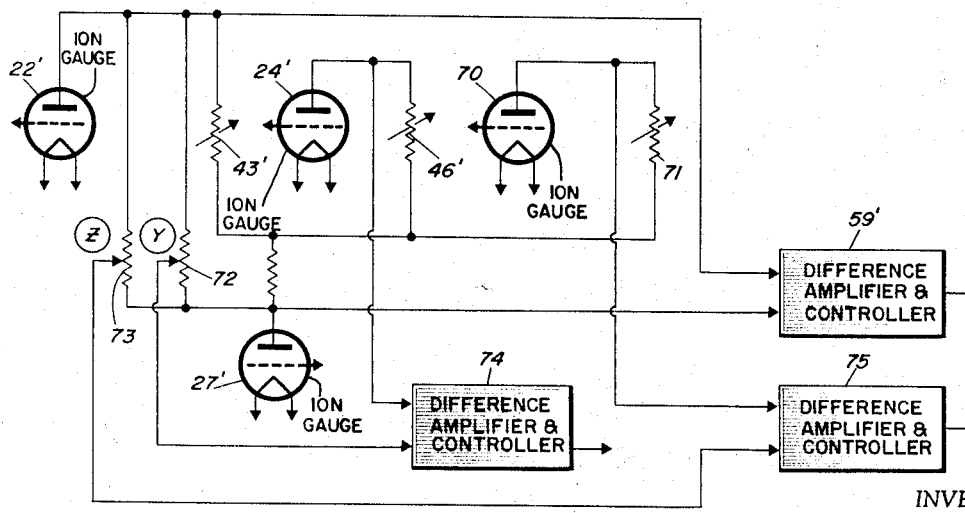
Figure 2:
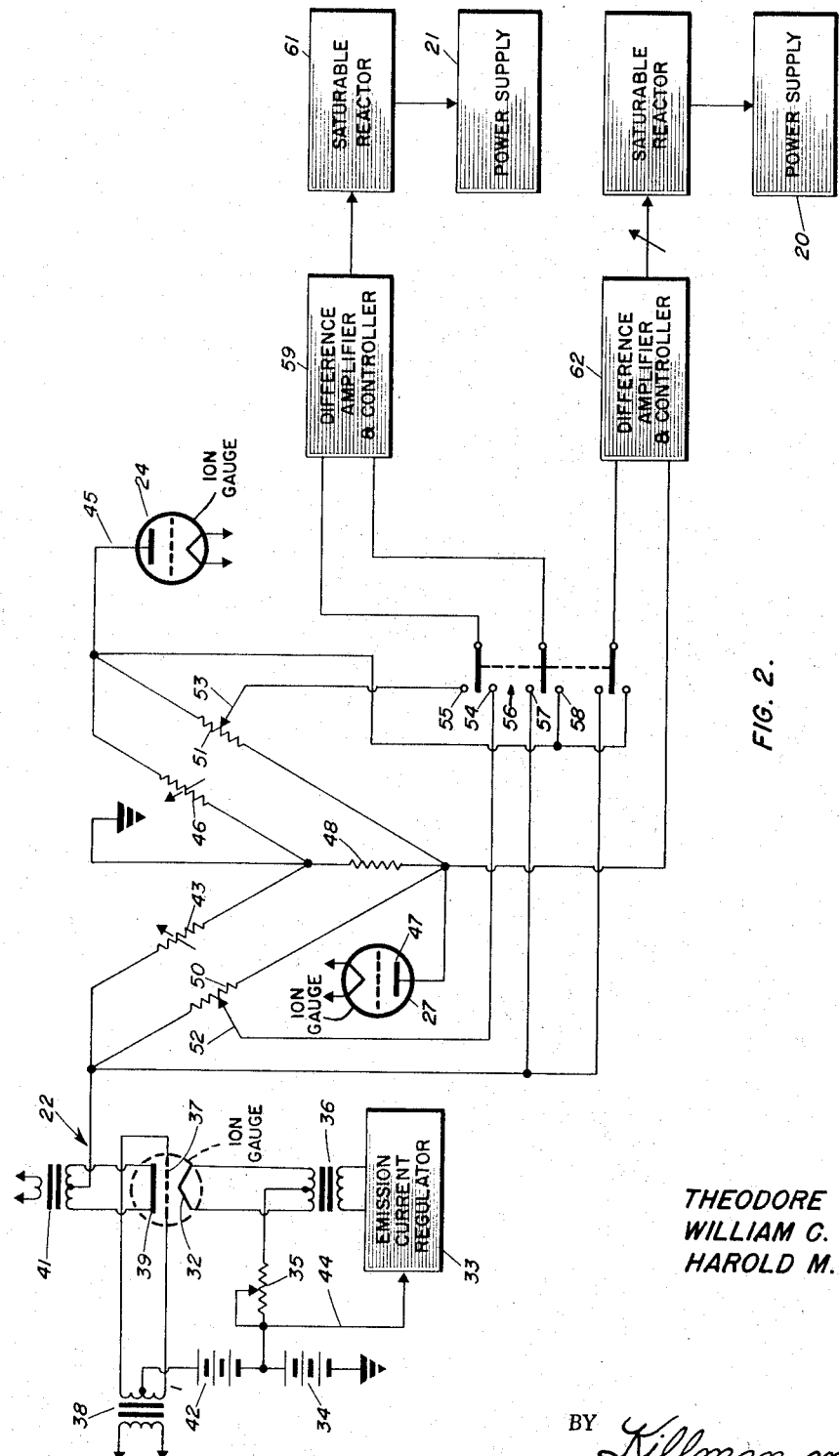

In the drawings:
FIG. 1 is a pictorial view of the invention with portions thereof shown in functional block diagram form.
FIG. 2 is a schematic of the control illustrated in FIG. 1 and
FIG. 3 is a schematic of the invention as adapted to control evaporation from three sources.

Referring to FIG. 1, a substrate 10, upon which a composite film is to be deposited, is shown contained within a sealed system formed by a bell jar 12 or similar vessel arranged to be exhausted by a vacuum pump 14. The usual supports and substrate masks used for controlling the pattern of film deposition have not been shown, although their existence is necessarily implied. A pair of evaporators 16, 18, here shown as trays of refractory metal, are positioned for straight line access to the depositional surface of the substrate. The evaporators 16, 18 contain solid material which is vaporized by the passage of an electrical heating current through the trays. The heating currents are supplied by controlled power supplies 20, 21. A pair of ion gauges 22, 24 are each positioned for direct access to the evaporators 16, 18. Shields 25, 26 protect the gauges from receiving vapor from an opposite source so that the ion current from either gauge is a measure solely of the vapor from the evaporator to which it is directly exposed, plus any current due to background pressure. A third ion gauge 27 protected by a shield 28 from direct access to either of the evaporators 16, 18 is provided to measure background pressure.

It should be observed that in the very low pressure at which operations are conducted, the trajectories of vapor molecules emerging the evaporators are straight line paths. Reflection of vapor molecules from the chamber walls, supporting structure and the like is negligible because the impinging molecules give up their energy to the cooler collision surface. The result is that there will be considerable condensation of the evaporated materials upon parts of the system other than the substrate, but there will be no interaction between an evaporator and a gauge to which there is no direct access. The background gases, however, are normally mobile at temperatures of the structure of the system. Hence, the background gases can be expected to permeate the system and to affect the ion currents of any gauge exposed in the system.

An output signal is taken from each of the gauges 22, 24 and 27 to a rate measuring and control device 30 where, by means later described, a signal is generated for controlling the current output of the evaporator power supplies 20, 21, thus determining the rate and proportions of the vapor stream.

In FIG. 2 the rate measuring circuit is shown schematically with the remainder of the control 30 appearing as functional blocks. The filament 32 of ion gauge 22, one of the vapor measuring gauges of FIG. 1, is supplied alternating current from an emission current regulator 33. A source 34 of positive bias potential is connected through an emission current sensing resistor 35 to a center tap on the secondary of a filament transformer 36. Alternating current is supplied to the grid 37 from a grid transformer 38 having a center tapped secondary. The alternating current through grid 37 raises the grid temperature above the dew point of the vapor material to prevent condensation thereon and contamination of the gauge. For the same reason, the plate or collector 39 is heated by alternating current from a transformer 41 having a center tapped secondary. While the temperature of both the collector electrodes is maintained above the vapor dew point, it nevertheless is not so high as to cause electron emission from these electrodes.

The grid 37 is biased positively with respect to the filament 32 by a bias source 42 connected to the center tap of the secondary of transformer 38. The collector 39 is returned to ground through an adjustable resistor 43 connected to the center tap of the secondary of transformer 41. The collector 39 is thus biased negatively relative to the filament 32. A feedback lead 44 conducts the signal output of the emission sensing resistor 35 to the emission current regulator 33 which varies the current supplied filament 32 and hence the filament temperature to maintain constant emission.

Gauge 24, which is also in a vapor stream, is supplied bias potentials and heating currents for the grid and collector electrodes in the same manner as described for gauge 22. The grid and collector electrodes of gauge 27 need not be heated since this gauge is exposed only to the non-condensible background gases. The grid and collector of gauge 27 are biased in a manner identical to gauges 24 and 22. The emission currents of both gauges 24 and 27 are maintained constantly by regulators similar to the emission current regulator 33 of gauge 22. The collector 45 of gauge 24 is grounded through an adjustable resistor 46. The collector 47 of gauge 27 is grounded through a fixed resistor 48. A potentiometer 50 of substantially higher value than the sum of the values of resistors 43 and 48 is connected between the collectors 39 and 47 of gauges 22 and 27. A similarly high valued potentiometer 51 is connected between the collectors 45 and 47 of gauges 24 and 27. The symmetry of the circuit may be maintained by connecting a high value fixed resistor (not shown) between the collectors of gauges 22 and 24, but such resistor is not ordinarily required. Arms 52, 53 of potentiometers 50, 51 are connected to opposite switch contacts 54, 55 of the first pole of a triple pole-double throw switch 56. Collectors 39, 45 of gauges 22, 24 are connected to opposite contacts 57, 58 of a second pole of switch 56. Connections from the first and second poles of switch 56 are made to the inputs of a difference amplifier 59. The output of difference amplifier 59 constitutes a control signal for a saturable reactor 61 which regulates heating current for the evaporator power supply 21.

Operation of the circuit of FIG. 2 first involves pumping the vacuum chamber down to the operating pressure. Without introducing any vapor in the chamber, all three gauges 22, 24 and 27 register background pressure. Adjustment is then made of resistors 43 and 46, so that zero voltage is read from collector 47 of gauge 27 to collector 39 of gauge 22 and from collector 47 to collector 45 to gauge 24. Voltages measured across these points will hereafter be designated $E_{22}$ and $E_{24}$, respectively. The characteristics of the gauges are sufficiently identical that thereafter, when vapor is introduced in the chamber variations in $E_{22}$ and $E_{24}$ are proportional to the vapor rates to which gauges 22 and 24 are exposed. Let gauge 22 be exposed to the vapor of material A to be deposited at a controlled rate and gauge 24 be exposed to the vapor of material B to be deposited at rate bearing a fixed proportion to the rate of material A. With $E_{22}$ and $E_{24}$ adjusted for zero at background pressure, the difference therebetween is also zero. If the vapor rates of materials A and B are equal, voltages $E_{22}$ and $E_{24}$ are equal and the difference between the two remains zero. If material B is to be deposited at one-half the rate of material A, the difference between $E_{22}$ and $E_{24}$ is then equal to one-half $E_{22}$. The difference between the voltage at the arm 52 of potentiometer 50, adjusted to yield one-half $E_{22}$, and $E_{24}$ is zero, however, for a vapor rate for material B equal to one-half the vapor rate of material A. Difference amplifier and controller 59 is therefore adjusted to control the evaporator power supply 21 at such level as to maintain the difference between its input voltages at zero. Difference amplifier and controller 62 is adjusted to control evaporator power supply 20 at a level producing a constant value difference between its input voltages. The constant difference value at amplifier 62 represents the larger of the two evaporation rates which may be deemed the rate subject to absolute control. The smaller of the two rates, controlled by amplifier 59, may be deemed the rate subject to relative control. Of course, connections to amplifiers 59 and 62 may be rearranged so that the smaller evaporation rate is controlled with reference to the background and the higher rate is controlled by the difference between a fractional part of the higher rate and the lower rate. In the latter event, the smaller rate is subject to absolute control and the higher rate is subject to relative control.

The third pole of switch 56 permits the selection of either of the evaporators 16 or 18 as the source of the material subject to absolute control and hence, the material forming the major constituent of the deposition. When the proportion of material B is to exceed that of material A, potentiometer 51 substitutes in function for potentiometer 50, as is evident from the connections to the contacts of the third pole of switch 56.

The system of FIG. 2 can be extended to control simultaneously the rates of any desired number of materials. In the simplified diagram of FIG. 3, control is provided for a mixture of vapors from three different materials. It will be understood that all gauges are provided with emission current regulators and appropriate electrode biases. Heating is also provided for gauge electrodes exposed to condensible vapors. Gauges 22', 24' and 70 are each exposed to vapor from respectively associated evaporators containing materials X, Y and Z. The vapor gauges are each shielded so as to be sensitive to the vapor of only one of the materials. The background pressure is sensed by gauge 27', which is shielded from the vapors of all three materials. The system is similar to that of FIG. 1 with the addition of a third evaporator and gauge 70. Gauge 22' is exposed to material constituting the principal proportion of the vapor mixture. Gauges 24' and 70 are exposed to the minor constituent vapors. Adjustable resistors 43', 46' and 71 are provided for the purpose of adjusting to zero the voltage measured between the collector of gauge 27' and the collectors of gauges 22', 24' and 70 when the latter gauges are exposed only to background pressure. Voltages from the collectors of gauges 22' and 27' are applied to a difference amplifier and controller 59' adjusted to maintain a constant difference therebetween and hence, the evaporation rate of the material X constant at the desired figure. Potentiometers 72 and 73 are connected between the collector of gauge 22' and the collector of gauge 27'. The potentiometers are adjusted to divide the voltage between the collector of gauge 22' and the collector of gauge 27' in the same proportions as the minor constituent vapors of Y and Z are to bear to the major constituent vapor of X. The voltage at the arm of potentiometer 72 is applied as one input to a difference amplifier and controller 74. The voltage at the collector of gauge 24' is applied as the other input to amplifier 74. Similarly to the apparatus of FIG. 2, controller 74 maintains the temperature of the evaporator for material Y at such degree as to maintain the difference between its input voltages at zero. The vapor rate of material Y will then be in the desired proportion relative to the vapor rate of material X. In like manner, the voltage at the arm of potentiometer 73 is compared with the collector voltage of gauge 70 in a difference amplifier and controller 75. Controller 75 varies the temperature of an evaporator for the material Z to maintain the difference between its input voltages at zero. The vapor of material Z will then be in the same proportion to the vapor of material X as the voltage at the arm of potentiometer 73 bears to the total voltage across that potentiometer. The composition and rate of deposition of vapors from three materials is thus automatically controlled. The vapor rate of one of the materials is controlled absolutely to fix the deposition rate, while the vapor rates of the other two materials are controlled relative to the rate of the first to fix the composition of the vapor mixture. The arrangement of FIG. 3 may be extended to accommodate still more materials, if desired, without affecting its principal of operation.

Obviously, the structure may be varied in minor particulars without departing from the teachings of the disclosure. It is to be understood therefore the invention is limited solely by the scope of the appended claims.

The invention claimed is:

1. Apparatus for simultaneously evaporating in controlled proportions a plurality of materials, comprising
a vessel with facilities for maintaining said vessel in a near vacuum condition,
a plurality of containers within said vessel, each holding one of the materials to be evaporated,
individually controllable heating means for each of said containers,
a first ion gauge exposed to the background gases in said vessel and shielded from direct exposure to each of said containers,
a plurality of additional ion gauges each of which is exposed to direct view of one of said containers while being shielded from view of the remaining containers,
means combining the output of said first ion gauge with the output of one of said additional ion gauges for providing a control signal to one of said heating means, and
a plurality of means providing individual control signals to the heating means for the remainder of said containers wherein the individual control signal to the heating means for a particular container is derived from a combination of the output of the ion gauge directly viewing that container with a portion of the output of the ion gauge having its output combined with said first ion gauge.

2. Apparatus for simultaneously evaporating a plurality of materials with constant proportionality of rates, comprising
a vacuum system,
an evaporator in said vacuum system for each material to be evaporated,
an ion gauge for and associated with each of said evaporators, each of said ion gauges being exposed to the vapor from its associated evaporator and shielded from the vapor of the other evaporators,
an ion gauge for measuring background pressure in the vacuum system,
means controlling a first one of said evaporators in accordance with the difference between the output of the one of said ion gauges exposed to the vapor from said first evaporator and the output of said background pressure gauge, and
means controlling the remainder of said evaporators individually in accordance with the difference between the outputs of the ion gauge of said first evaporator and the ion gauge exposed to the vapor from the particular controlled evaporator.

3. Apparatus for controlling the evaporation rates of materials, comprising
a vacuum chamber,
an evaporator for each of said materials in said chamber,
a first ion gauge exposed only to the vapor of one of said materials constituting the major portion of the vapors in said chamber and to the residual gases in said chamber,
a second ion gauge exposed only to the residual gases in said chamber,
a third ion gauge exposed only to the vapor of one of said materials constituting a minor portion of the vapors in said chamber and to the residual gases in said chamber,
each of said ion gauges including cathode, grid, and collector electrodes,
means for heating said cathodes to electron emission temperature, said means adjusted to produce constant electron emission currents,
bias means for said grid and collector electrodes,
means responsive to the difference in collector currents of said first and second gauges for controlling the evaporator producing the vapor to which said first gauge is exposed, and
means responsive to the difference between a selectable portion of the collector current of said first gauge and the collector current of said third gauge for controlling the evaporator producing the vapor to which said third gauge is exposed.

4. Apparatus for simultaneously monitoring and controlling the evaporation rates of a plurality of materials, comprising,
a plurality of evaporators, each of said evaporators evolving a vapor stream of material,
a background ion gauge shielded from all said vapor streams but exposed to the background gases common to all said streams of vapor,
a plurality of ion gauges each of which is exposed to the vapor stream of one of the evaporant materials while being shielded from other vapor streams,
means calibrating the outputs of said plurality of ion gauges,
means controlling a first one of said evaporators in accordance with the difference between the output of the ion gauge exposed to the vapor from said first evaporator and the output of said background pressure gauge,
means controlling the remainder of said evaporators individually in accordance with the difference between the output of the ion gauge exposed to said first evaporator and the ion gauge exposed to the vapor from the particular controlled evaporator, and
means combining the outputs of each of said plurality of ion gauges with the output of said background ion gauge to produce indications of the rate of evaporation of said materials.

References Cited by the Examiner
UNITED STATES PATENTS

| | | | |
|---|---|---|---|
| 2,391,595 | 12/1945 | Richards et al. | 88—1 |
| 3,050,981 | 8/1962 | Schwarz | 73—15 |
| 3,166,246 | 1/1965 | Fielden | 219—499 |
| 3,247,361 | 4/1966 | Woodley | 219—501 |

OTHER REFERENCES

Giedd et al.: IBM Technical Disclosure Bulletin, "Evaporation Rate Monitor," vol. 4, No. 9, pp. 13–14, February 1962.

Giedd et al.: The Review of Scientific Instruments, "Evaporation Rate Monitor," vol. 31, No. 7, pp. 773–775, July 1960.

Perkins: 1951, Transactions of the Eighth National Vacuum Symposium (American Vacuum Society), combined with the Second International Congress on Vacuum Science and Technology, "An Evaporation Rate Control System Employing a Heated Electrode Sensing Gauge," vol. 2, pp. 1025–1030.

RICHARD M. WOOD, *Primary Examiner.*

ANTHONY BARTIS, *Examiner.*

C. L. ALBRITTON, *Assistant Examiner.*